(12) United States Patent
Ikemoto et al.

(10) Patent No.: US 8,748,332 B2
(45) Date of Patent: Jun. 10, 2014

(54) METHOD FOR CLEANING USED DENITRATION CATALYST

(75) Inventors: Seiji Ikemoto, Kure (JP); Yasuyoshi Kato, Kure (JP); Keiichiro Kai, Kure (JP)

(73) Assignee: Babcock-Hitachi Kabushiki Kaisha, Tokyo (JP)

(*) Notice: Subject to any disclaimer, the term of this patent is extended or adjusted under 35 U.S.C. 154(b) by 196 days.

(21) Appl. No.: 13/516,887

(22) PCT Filed: Dec. 17, 2010

(86) PCT No.: PCT/JP2010/072784
§ 371 (c)(1),
(2), (4) Date: Jul. 12, 2012

(87) PCT Pub. No.: WO2011/078084
PCT Pub. Date: Jun. 30, 2011

(65) Prior Publication Data
US 2012/0270723 A1    Oct. 25, 2012

(30) Foreign Application Priority Data
Dec. 22, 2009  (JP) ................. 2009-290584

(51) Int. Cl.
| | | |
|---|---|---|
| *B01J 38/48* | (2006.01) | |
| *B01J 38/60* | (2006.01) | |
| *B01J 20/32* | (2006.01) | |
| *B01J 20/14* | (2006.01) | |
| *B01J 20/28* | (2006.01) | |
| *B01J 20/34* | (2006.01) | |
| *B01J 21/20* | (2006.01) | |
| *B01J 23/92* | (2006.01) | |
| *B01J 38/62* | (2006.01) | |
| *B01D 53/64* | (2006.01) | |
| *B01D 53/96* | (2006.01) | |
| *B01D 53/88* | (2006.01) | |
| *B01J 20/06* | (2006.01) | |
| *B01J 20/08* | (2006.01) | |
| *B01D 53/86* | (2006.01) | |
| *B01D 53/94* | (2006.01) | |

(52) U.S. Cl.
CPC .............. *B01J 20/3236* (2013.01); *B01J 20/14* (2013.01); *B01J 20/28016* (2013.01); *B01J 20/28045* (2013.01); *B01J 20/34* (2013.01); *B01J 20/345* (2013.01); *B01J 21/20* (2013.01); *B01J 23/92* (2013.01); *B01J 38/62* (2013.01); *B01D 53/64* (2013.01); *B01D 53/96* (2013.01); *B01D 53/88* (2013.01); *B01J 20/06* (2013.01); *B01J 20/3204* (2013.01); *B01J 20/08* (2013.01); *B01D 2257/602* (2013.01); *B01D 53/8625* (2013.01); *B01D 53/9409* (2013.01); *B01D 2255/106* (2013.01)
USPC .............................................. 502/27; 502/22

(58) Field of Classification Search
CPC ...... B01J 20/34; B01J 20/345; B01J 20/3416; B01J 21/20; B01J 23/92; B01J 38/62; B01J 20/3204; B01J 38/00; B01J 38/60; B01D 53/64; B01D 53/56; B01D 53/8625; B01D 53/9409; B01D 53/96; B01D 53/8628
USPC ....................................................... 502/20–56
See application file for complete search history.

(56) References Cited

U.S. PATENT DOCUMENTS

2007/0167309 A1* 7/2007 Olson ............................. 502/27
2012/0270723 A1* 10/2012 Ikemoto et al. ................. 502/28

FOREIGN PATENT DOCUMENTS

| JP | 58-189043 | 11/1983 |
|---|---|---|
| JP | 59-098738 | 6/1984 |
| JP | 63-147519 | 6/1988 |
| JP | 2003-000135 | 1/1991 |
| JP | 2005-185928 | 7/2005 |
| JP | 2009-006226 | 1/2009 |

* cited by examiner

*Primary Examiner* — Jennifer A Smith
(74) *Attorney, Agent, or Firm* — Fay Sharpe LLP

(57) ABSTRACT

Provided is a method for cleaning a used denitration catalyst, which prevents release of mercury to the atmosphere by collecting and removing mercury which would have been released to the atmosphere in the process of cleaning the used denitration catalyst. The method comprises immersing the used denitration catalyst mainly composed of titanium oxide and having been used in exhaust gas containing mercury in a cleaning liquid, and stirring the cleaning liquid to dissolve and remove catalyst poisons including the mercury from the used denitration catalyst, wherein a waste gas generated in the step of stirring the cleaning liquid is conducted to a flue having a mercury removal device so as to remove the mercury, and then vented to the atmosphere.

10 Claims, 2 Drawing Sheets

1 : cleaning liquid tank
2 : cleaning liquid
3 : used denitration catalyst unit
4 : waste gas
5 : hood
6 : mercury remover-packed bed
7 : air compressor fan
8 : air compressor pipe
9 : flue
10 : air suction fan
11 : absorption bottle
12 : glass filter
13 : gold-supporting diatomaceous earth

METHOD FOR CLEANING USED DENITRATION CATALYST

TECHNICAL FIELD

The present invention relates to a method for cleaning used denitration catalysts, and particularly relates to a method for collecting and removing mercury to prevent release of the mercury to the atmosphere wherein the mercury has been released in the cleaning process of a used denitration catalyst used in exhaust gas of a coal-fired boiler.

BACKGROUND ART

Recently, there is a need to recycle used catalysts in order to reduce waste generation. In particular, the performance of an exhaust gas denitration catalyst for exhaust gas of a boiler using coal or heavy oil as fuel is degraded over time by alkali metals, alkaline-earth metals, and arsenic compounds. Most of such poisonous substances (e.g., heavy metals) attached to the denitration catalyst can be dissolved in a cleaning liquid in the cleaning process to remove the poisonous substances.

A conventional method for cleaning used catalysts is generally carried out by immersing used catalysts in the form of unit in a cleaning liquid tank having a size that can accommodate one or more units. In the cleaning, water, sulfuric acid, oxalic acid, ammonia, sulfate, and various other cleaning liquids are generally used singly or in combination. The denitration performance of the catalysts is known to be recovered by such cleaning (e.g., Patent Documents 1 and 2). Moreover, during cleaning, it is reportedly effective to stir the cleaning liquid with air bubbles (aeration), or generate cavitation by ultrasonic vibration (e.g., Patent Document 3). This is because poisoning components and impurities can be removed in a short time in the cleaning process. The cleaned catalyst is immediately dried, and gas generated by aeration or cavitation in the cleaning process is generally vented to the atmosphere as it is.

PRIOR ART LIST

Patent Literatures

Patent Document 1: JP 2000-37634 A
Patent Document 2: JP 2000-37635 A
Patent Document 3: JP 2005-279452 A

SUMMARY OF THE INVENTION

Problems to be Resolved by the Invention

Meanwhile, as for many catalysts used in coal-fired boilers, parts of mercury compounds contained in the exhaust gas are adsorbed and attached to the catalysts. When such used denitration catalysts, to which mercury compounds are attached, are cleaned by the above-mentioned method, the attached mercury compounds are dissolved in the cleaning liquid. However, as a result of extensive research, the present inventors revealed that the mercury compounds dissolved in the cleaning liquid are released to the atmosphere in the step of stirring the cleaning liquid by aeration and the like. Mercury is a poisonous substance for the human body, and mercury generated during cleaning worsens the work environment. For these reasons, the emission of mercury must be lowered at a very low level. Even when a treatment equipment for cleaning up waste gas generated in the cleaning process is provided, elemental mercury cannot easily be removed, and the waste gas containing mercury is thus vented to the atmosphere as it is.

An object of the present invention is to provide a method for cleaning a used denitration catalyst, which prevents release of mercury to the atmosphere by collecting and removing the mercury which would have been released to the atmosphere in the process of cleaning the used denitration catalyst.

Means for Solving the Problems

The invention defined in the present application to achieve the above problem is as follows:

(1) A method for cleaning a used denitration catalyst, the method comprising:

immersing the used denitration catalyst in a cleaning liquid, wherein the catalyst is mainly composed of titanium oxide and has been used in denitration of exhaust gas containing mercury, and stirring the cleaning liquid to dissolve and remove catalyst poisons including the mercury from the used denitration catalyst, wherein a waste gas generated in the step of stirring the cleaning liquid is conducted to a flue having a mercury removal device so as to remove the mercury, and then vented to the atmosphere.

(2) The method according to (1), wherein the cleaning liquid is water, an aqueous solution of oxalic acid or an aqueous solution of citric acid.

(3) The method according to (1) or (2), wherein the mercury removal device is a packed bed filled with a mercury remover in which gold is supported on at least one carrier selected from the group consisting of diatomaceous earth, titanium oxide, and alumina, in which the waste gas passes through the packed bed.

(4) The method according to (1) or (2), wherein the mercury removal device is a packed bed filled with activated carbon, in which the waste gas passes through the packed bed.

(5) The method according to any one of (1) to (4), wherein the stirring of the cleaning liquid is performed by aeration and/or cavitation.

The present inventors carried out extensive research on the problem of the release of mercury in the cleaning process of used denitration catalysts, and consequently revealed the following phenomenon in a stirring operation by air. First, the mercury compounds attached to the catalyst to be treated are presumably in the form of metal mercury and mercuric oxide. Among these, metal mercury is highly volatile and thus easily released to the atmosphere by a stirring operation, such as aeration or cavitation. Further, mercuric oxide attached to the catalyst to be treated is reduced into metal mercury by reducing substances coexisting in the cleaning liquid. The resulting metal mercury is similarly volatilized by aeration and released to the atmosphere. In addition, when a reducing substance derived from the used denitration catalyst is dissolved in the cleaning liquid, mercuric oxide is reduced into metal mercury by the reducing substance. As a result, mercury may be similarly released to the atmosphere by aeration. The principle that mercuric oxide is reduced and released to the atmosphere in the cleaning process is considered as follows. For example, in an oxalic acid solution, divalent mercury ions are presumably reduced to zero-valent metal mercury by oxidoreduction reactions represented by the following formulae (1) and (2):

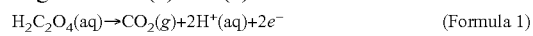

In the method of the present invention, the waste gas containing mercury generated in the above cleaning process is collected without leakage, while passing through a flue having a mercury removal device. As the mercury removal device, a packed bed supporting a mercury remover, such as metal (e.g., gold) that produces amalgam together with mercury, or a packed bed of activated carbon can be used. While the waste gas suctioned by a fan passes through such a packed bed provided in the flue, the mercury in the waste gas generates amalgam together with, for example, the gold in the packed bed, and is removed from the waste gas. Thus, the mercury is prevented from being released to the atmosphere. Moreover, when the mercury remover is activated carbon, the mercury in the waste gas is physically adsorbed by the activated carbon, and is thus prevented from being released to the atmosphere.

Advantageous Effects of the Invention

According to the present invention, in the process of cleaning used denitration catalysts, the release of mercury from the cleaning liquid to the atmosphere during stirring can be lowered at a very low level. Thereby, environmental pollution caused by mercury and mercury compounds, and the influence thereof on the human body can be reduced.

The mercury remover used in the mercury removal device in the present invention is not particularly limited as long as it can adsorb mercury. As the mercury remover, an activated carbon, a filler in which gold is supported on diatomaceous earth, titanium oxide or alumina, or the like is preferred. The form of the filler is not particularly limited, and any form, such as granular, honeycomb, or plate, can be used.

The cleaning liquid used in the present invention is not particularly limited as long as it can remove alkali metal elements or alkaline-earth metal elements attached to denitration catalysts. Usually, water, an acid aqueous solution in which oxalic acid or citric acid is dissolved, or an alkaline aqueous solution of sodium hydroxide, potassium hydroxide, or the like can be used. The temperature of the cleaning liquid is preferably 50° C. to 60° C. in terms of high efficiency of removing catalyst poisons.

In the present invention, the following method is also available, other than the above mercury removal device. That is, activated carbon is sprayed in the flue after the waste gas passes through the hood, so that the mercury is adsorbed by the activated carbon. The activated carbon adsorbing mercury can be then collected by a bag filter before the mercury is released to the atmosphere. Alternatively, metal mercury is oxidized into mercuric oxide by irradiation with a light source that excites metal mercury to divalent mercury (e.g., light having a wavelength of 253.7 nm) in the flue, and the resulting mercuric oxide is removed from the waste gas by wet absorption by a scrubber before being released to the atmosphere.

EMBODIMENTS FOR CARRYING OUT THE INVENTION

Figure 1:
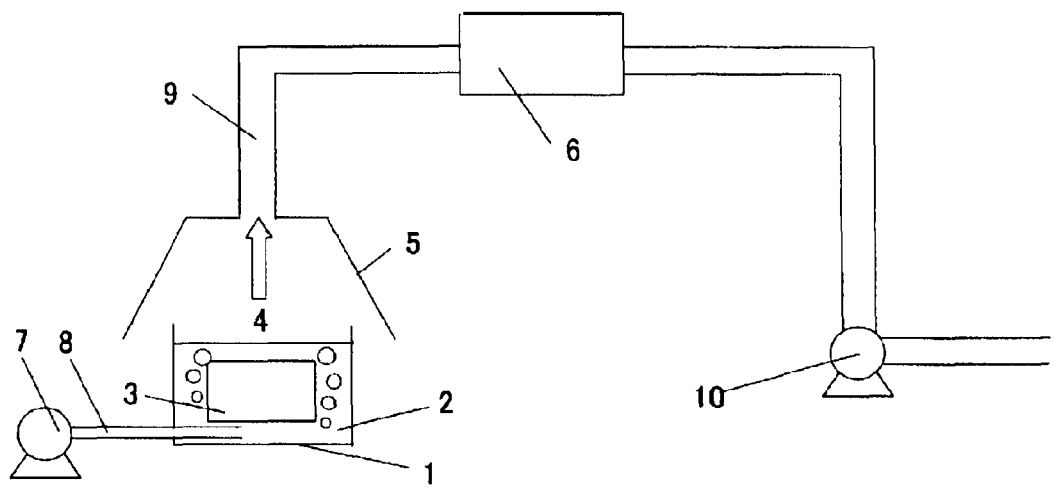
FIG. 1 a diagram for explaining an Example of the present invention.

The present invention is described in more detail below with reference to Examples shown in the drawings. FIG. 1 is a diagram for explaining an apparatus for carrying out the cleaning method of the present invention. The apparatus comprises a cleaning operation section for immersing a used denitration catalyst in a cleaning liquid and performing aeration; and a waste gas treating section for treating waste gas generated during the cleaning operation. More specifically, the apparatus comprises a cleaning liquid tank 1 for immersing a unit in a cleaning liquid 2 in which the unit is composed of a container and a used catalyst 3 placed in the container; an air compressor pipe 8 for blowing air to lower side of the used catalyst 3 in the cleaning liquid tank 1; a fan 7 for compressing air in the pipe 8, a truncated conical hood 5 provided above the cleaning liquid tank 1, a flue 9 connected to the hood, a mercury remover-packed bed 6 provided in the flue 9, and an air suction fan 10 provided in the outlet side of the packed bed 6 in the flue 9.

First, the catalyst 3 to be treated is immersed in the cleaning liquid 2 in the cleaning liquid tank 1, and air is introduced to the cleaning liquid tank 1 by the fan 7. The cleaning liquid 2 is stirred by the air introduced by the fan 7 and this operation removes poisoning components and impurities attached to the catalyst 3. Further, waste gas 4 generated during cleaning is suctioned by the fan 10 from the hood 5 provided above the cleaning liquid tank 1, and vented to the atmosphere from the outlet of the flue 9. The mercury remover-packed bed 6 is placed between the hood 5 and the outlet of the flue 9. When the waste gas passes through the mercury remover-packed bed 6, the mercury in the waste gas is adsorbed and removed. The hood 5 helps suction of the waste gas 4 generated in the cleaning process without leakage and also prevents the cleaning liquid being scattered. The powers for the fan 7 and the fan 10 in the present invention are set so that the suction power of the fan 10 is greater than the power of the fan 7 to compress air. Because of this setting, the waste gas 4 generated during cleaning can be reliably conducted to the mercury remover-packed bed 6.

Figure 2:
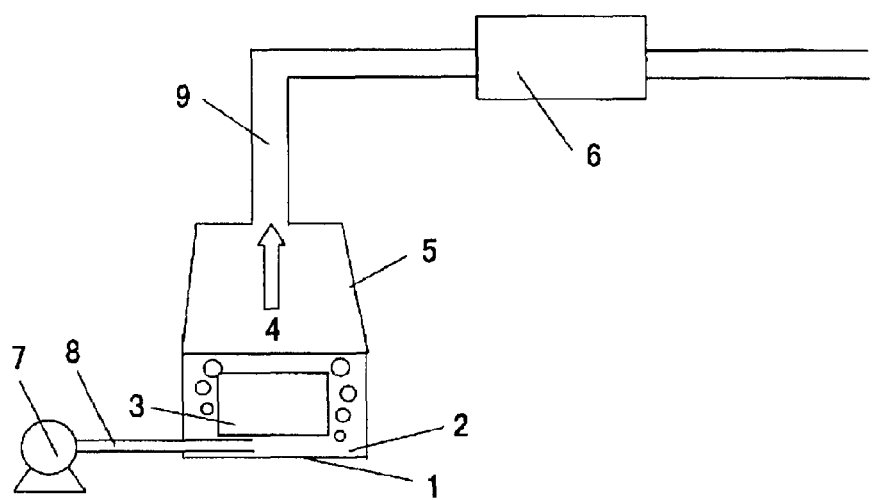
FIG. 2 a diagram for explaining an Example of the present invention.

FIG. 2 is a diagram for explaining an apparatus of another embodiment of the present invention having a structure similar to that shown in FIG. 1. The difference from FIG. 1 is that a cleaning liquid tank 1 and a hood 5 are completely closed and connected to a flue 9. Due to this structure, air compressed by a fan 7 passes through the hood 5 and the flue 9 to a mercury remover-packed bed 6 and is vented to the atmosphere from the flue 9. When waste gas generated during cleaning passes through the mercury remover-packed bed 6, the mercury in the cleaning waste gas can be adsorbed and removed by the mercury remover-packed bed 6. According to the structure of FIG. 2, since there is no need to provide an air suction fan 10, the cost for installation is reduced, as compared to the structure of FIG. 1. In addition, since no air suction fan is used, the power for operating the device can be lowered, as compared to FIG. 1.

Test Example 1

Figure 3:
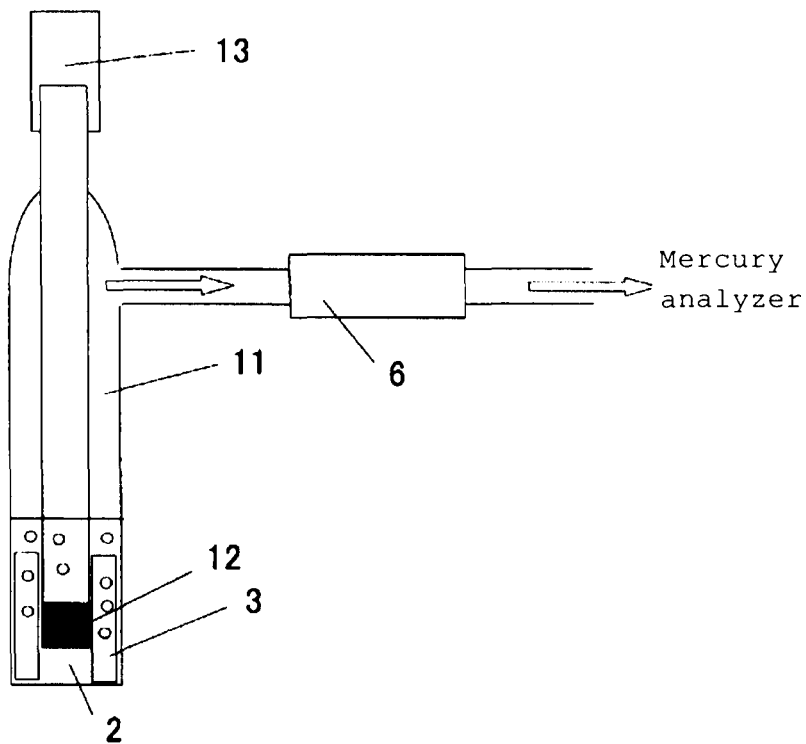
FIG. 3 a diagram for explaining a simulation test instrument in an Example of the present invention.

To confirm the effect of the method in the present invention, the following simulation test was carried out. FIG. 3 schematically illustrates the test method. The catalyst for the test was a used denitration catalyst that was a plate-type catalyst comprising Ti, Mo, and V as catalytic components and had been operated for 10,000 hours in an actual equipment of a coal-fired boiler discharging exhaust gas containing mercury. The catalyst was cut into four pieces in the size of 50 mm×20 mm (10 cm$^2$). A cleaning liquid (30 mL) was placed in a 100-mL absorption bottle 11, and previously warmed to 60° C. The above-prepared four catalyst pieces were immersed in the liquid. A mercury remover 6 was provided in a pipe extending from the outlet of the absorption bottle 11 to a mercury analyzer (WA-4, produced by Nippon Instruments Corporation), and the amount of mercury in the gas after passing through the mercury remover 6 was measured by the mercury analyzer. The mercury remover used in the test was 30 mg of a mercury adsorbent packed in a mercury collecting tube (produced by Nippon Instruments Corporation). Aeration of the cleaning liquid was performed in such a manner that a gold-supporting diatomaceous earth 13 was placed on the tip end of the absorption bottle 11, and air from which atmospheric mercury had been removed was compressed at a rate of 0.5 L/min for 20 minutes. The cleaning liquid 2 used was a 1 mol/L oxalic acid solution.

Test Example 2

The test was carried out in the same manner as in Test Example 1, except that the cleaning liquid was changed to a 1 mol/L citric acid solution.

Test Example 3

The test was carried out in the same manner as in Test Example 1, except that the cleaning liquid was changed to water.

Test Example 4

The test was carried out in the same manner as in Test Example 1, except that the mercury adsorbent was changed to 30 mg of activated carbon.

Test Example 5

The test was carried out in the same manner as in Test Example 1, except that the mercury adsorbent 6 was not provided.

Table 1 summarizes the results obtained in Test Examples 1 to 5. As is clear from the table, in Test Example 5, which did not use a mercury adsorbent, mercury generated in the cleaning process was released to the atmosphere. In contrast, as is clear from Test Examples 1 to 4, which used a mercury adsorbent, mercury released during cleaning was removed by the mercury adsorbent. Thus, the release of the mercury to the atmosphere can be lowered.

TABLE 1

| Test example | Cleaning liquid | Mercury remover | Amount of mercury accumulated in catalyst (ng/40 cm$^2$) | Amount of mercury released from cleaning liquid (ng) | Amount of mercury after passing through mercury remover (ng) |
| --- | --- | --- | --- | --- | --- |
| Test Ex. 1 | 1N-oxalic acid | Gold/diatomaceous earth | 120.0 | 2.19 | 0.03 |
| Test Ex. 2 | 1N-citric acid | Gold/diatomaceous earth | 120.0 | 1.12 | 0.02 |
| Test Ex. 3 | water | Gold/diatomaceous earth | 120.0 | 0.66 | 0.02 |
| Test Ex. 4 | 1N-oxalic acid | Activated carbon | 120.0 | 2.19 | 0.03 |
| Test Ex. 5 | 1N-oxalic acid | None | 120.0 | 2.19 | 2.19 |

| EXPLANATION OF SYMBOLS | |
| --- | --- |
| 1: | cleaning liquid tank |
| 2: | cleaning liquid |
| 3: | used denitration catalyst unit |
| 4: | waste gas |
| 5: | hood |
| 6: | mercury remover-packed bed |
| 7: | air compressor fan |
| 8: | air compressor pipe |
| 9: | flue |
| 10: | air suction fan |
| 11: | absorption bottle |
| 12: | glass filter |
| 13: | gold-supporting diatomaceous earth |

The invention claimed is:

1. A method for cleaning a used denitration catalyst, the method comprising the steps of:

immersing the used denitration catalyst in a cleaning liquid, wherein the catalyst is mainly composed of titanium oxide and has been used in denitration of exhaust gas containing mercury, stirring the cleaning liquid to emit waste gas containing the mercury, passing the waste gas through a flue having a mercury removal device to obtain cleaned-up gas, and venting the cleaned-up gas to the atmosphere.

2. The method according to claim 1, wherein the cleaning liquid is water, an aqueous solution of oxalic acid or an aqueous solution of citric acid.

3. The method according to claim 1, wherein the mercury removal device is a packed bed filled with a mercury remover in which gold is supported on at least one carrier selected from the group consisting of diatomaceous earth, titanium oxide, and alumina, in which the waste gas passes through the packed bed.

4. The method according to claim 1, wherein the mercury removal device is a packed bed filled with activated carbon, in which the waste gas passes through the packed bed.

5. The method according to claim 1, wherein the stirring of the cleaning liquid is performed by aeration and/or cavitation.

6. The method according to claim 2, wherein the mercury removal device is a packed bed filled with a mercury remover in which gold is supported on at least one carrier selected from the group consisting of diatomaceous earth, titanium oxide, and alumina, in which the waste gas passes through the packed bed.

7. The method according to claim 2, wherein the mercury removal device is a packed bed filled with activated carbon, in which the waste gas passes through the packed bed.

8. The method according to claim 2, wherein the stirring of the cleaning liquid is performed by aeration and/or cavitation.

9. The method according to claim 3, wherein the stirring of the cleaning liquid is performed by aeration and/or cavitation.

10. The method according to claim 4, wherein the stirring of the cleaning liquid is performed by aeration and/or cavitation.

* * * * *